May 2, 1967
R. M. RAMEY ET AL
3,316,894
WATER HEATING AND STORAGE SYSTEM
Filed June 1, 1965
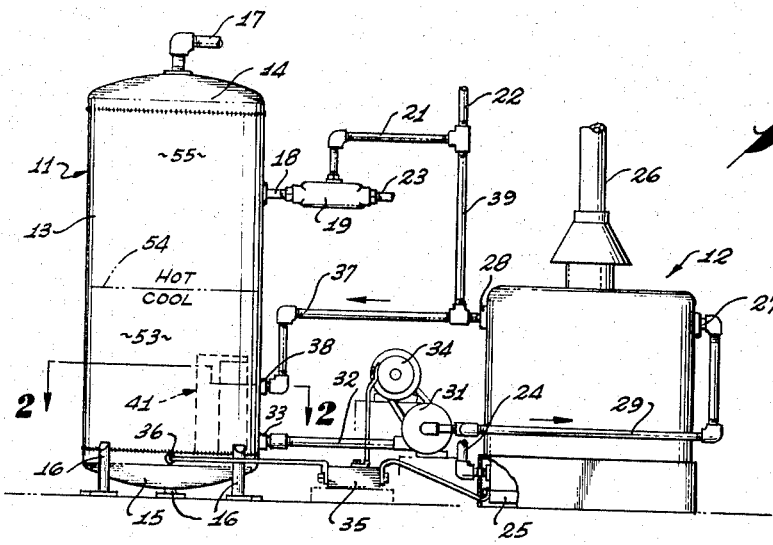
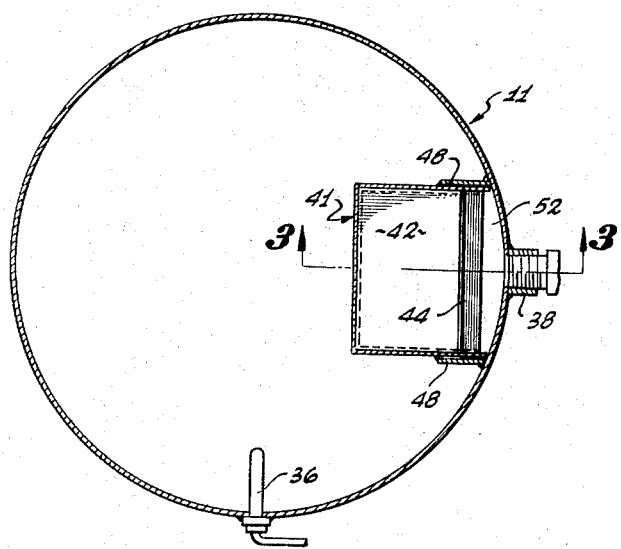
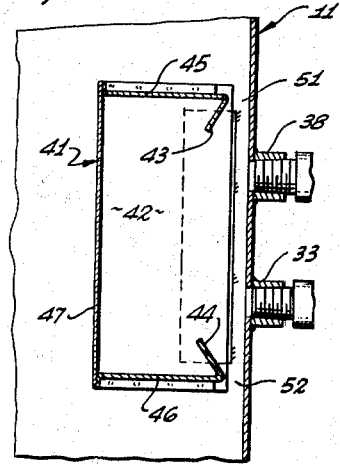
INVENTORS
ROBERT M. RAMEY
ROBERT G. PURDY
BY Fulwider, Patton, Rieber, Lee, and Utecht
ATTORNEYS ated May 2, 1967

3,316,894
WATER HEATING AND STORAGE SYSTEM
Robert M. Ramey, North Hollywood, and Robert G. Purdy, Los Angeles, Calif., assignors to Avy L. Miller, North Hollywood, Calif.
Filed June 1, 1965, Ser. No. 465,237
12 Claims. (Cl. 126—362)

The present invention relates generally to water heating and storage systems, and more particularly to installations where large volume demands of relatively hot water are required from time to time.

Such demands for hot water occur, for example, in establishments employing automatic dishwashing equipment and other devices which intermittently demand large volumes of hot water, such as at or about 180° F. The demand requirement is for the supply of this hot (180° F.) water over the entire demand period, so that not only must the water be stored at the high temperature required, but the store must supply the entire quantity desired at substantially this high temperature.

Each withdrawal of hot water from the hot water storage tank causes an influx of relatively cold water into the tank where, in most systems, it mixes with the hot water therein, thus reducing the temperature of the mixed water in the tank. While recirculation of the mixed lower temperature water through the heater of the system will eventually bring it to the desired high storage temperature, it is in the interim impossible to obtain water from the storage tank at the desired high temperature.

The system of Patent No. 2,833,273, granted May 6, 1958, for Hot Water Storage Tank and Water Heater System Embodying the Same, solves the problem of lower temperature of the water in the storage tank after withdrawal of water therefrom by establishing an interface between the high temperature water in the upper part of the tank and the lower temperature water supplied to the tank whereby the stored high temperature water and the incoming low temperature water are maintained substantially separate without mixing. Thereby a major portion of the original high temperature water in the tank can be withdrawn therefrom while maintaining its temperature substantially constant. This is effected, in the structure of the above-identified patent, by restricting turbulence within the storage tank to a mixing chamber which is in communication with a circulating system to a heater in which the water temperature is raised. The circulation of hot water out of the mixing chamber and of cold water thereinto is effected relatively slowly so that there is no turbulence in the main body of the storage tank and the interface is not disturbed but moves intact upwardly with the removal of hot water from the tank and slowly downwardly with the addition of hot water to the tank from the mixing chamber.

While the structure of the patent functions well as described for lower circulation rates through the water heater, it has been found that increase in the circulation rate may interfere with the integrity of the interface between the hot and cold water and no longer permit the withdrawal of the desired quantity of water at substantially the same high temperature. Such increased water heater circulation rates are desirable in many applications from the standpoint of heat input and system temperature recovery rate, but more importantly so as to secure high speed turbulent flow through the heat exchange tubes of the heater to avoid scaling and keep the interior surfaces of the tubes clean.

It is therefore an object of the present invention to provide an improved water heating and storage system in which an interface is maintained between high temperature water stored in a tank and cooler water brought into the bottom of the tank, regardless of a high circulation rate through the water heater of the system.

Another object of the present invention is the provision of an improved water heating and storage system providing for the intermittent supply of relatively large volumes of hot water at substantially constant temperature from a relatively small storage tank.

Another object of this invention is the provision of an improved water heating and storage system having a hot water storage tank wherein incoming replacement cold water is substantially prevented from mixing with high temperature water remaining in the storage tank while circulating water at a relatively high rate between the storage tank and the water heater of the system.

A further object of this invention is the provision of an improved hot water storage tank for a water heating and storage system which maintains separation between the hot water remaining in the storage tank and incoming cool water replacing water withdrawn from the tank while providing for rapid circulation through a heating loop outside of the tank to provide turbulent flow therethrough to clean the heat exchange tubes of the loop.

These and other objects and features of the invention will be apparent to those skilled in the art from the following specification and the appended drawing, in which:

FIGURE 1 is an elevational view of a water heating and storage system according to the present invention;

FIGURE 2 is a horizontal sectional view through the storage tank on offset lines 2—2 of FIGURE 1; and FIGURE 3 is a vertical sectional view through the mixing chamber of the storage tank taken on line 3—3 of FIGURE 2.

The system illustrated in FIGURE 1 includes a storage tank indicated generally at 11 and a water heater 12 which may be of conventional, gas-fired construction. The storage tank 11 has a generally cylindrical main body portion 13 and top and bottom closing caps 14 and 15, respectively, the tank being supported in vertical position by means of legs 16 welded or otherwise secured adjacent the bottom thereof and having feet engaging the supporting surface to mount the tank in upright position. The storage tank 11 has a hot water outlet conduit 17 connected through its top cap 14 and a second hot water outlet 18 leading to a thermostatic mixing valve 19 which is also fed by a line 21 from a cold water supply main 22 to deliver at conduit 23 a lower temperature mixture, for example, 140° F. for personal use. The water heater 12 is fed from a gas source 24 through a solenoid valve 25 into conventional burners adjacent the bottom of the water heater where the gas is burned as a fuel and the products of combustion are passed across heat exchange tubes (not shown) to the stack 26. The heat exchange tubes have an inlet 27 and an outlet at 28.

The inlet 27 to the heat exchange tubes of the heater 12 is connected by a conduit 29 to the outlet of a pump 31, the inlet to which is connected by a conduit 32 to an outlet coupling hub 33 from the storage tank 11. The pump 31 is driven by an electric motor 34 and the motor 34 and solenoid valve 25 are controlled from an electric relay 35 under the control of a thermostat 36 within and adjacent to the bottom of storage tank 11. The outlet 28 from the heat exchange tubes in the heater 12 is connected through a conduit 37 to the storage tank inlet coupling hub 38. The cold water supply main 22 may be connected to the conduit 37 through a conduit 39 or the cold water supply to the storage tank may be connected to the bottom of the storage tank, either beneath a diffuser plate or the bottom of the mixing chamber to be hereinafter described.

Within the tank, in front of the circulating loop inlet 38 and outlet 33, is mounted a rectangular, box-like enclosure 41 providing a mixing chamber 42 which, in effect, forms a part of the circulating heating loop. The enclosure 41 is enclosed on all sides except that toward the inlet and outlet for the loop and this side, which will be hereinafter referred to as the front of the enclosure, is impeded at its top and bottom by inwardly bent short baffle plates 43 and 44 extending from the front edges of the top and bottom walls 45 and 46, respectively, of the enclosure 41 and inclined toward the back wall 47. The enclosure 41 is supported within the tank by the side walls thereof being welded to vertical plates 48 which are in turn welded to the interior wall of the storage tank 11 at opposite sides of the inlet and outlet 38, 33 for the circulating heating loop.

Due to the arcuate interior surface of the tank 11 and the straight forward edges of the top and bottom walls 45, 46 of enclosure 41, there remain open, segmental areas 51 and 52 at the top and bottom of the enclosure 41 through which communication may be had between the interior of the tank 11 and the chamber 42. Thus heated water may rise from the chamber 42 through the segmental area 51 and cool water may enter the chamber 42 to replace it through the segmental area 52.

In the operation of the water heating and storage system according to the present invention, whenever cool water is present at the thermostat 36, the relay 35 energizes both the electric motor 34 and the solenoid valve 25 to both circulate water through the heater 12 and supply combustion fuel to be burned in the heater to raise the temperature of the circulating water. This circulation of water through the heater circulating loop and the application of heat to the circulating water continues until the entire tank 11 is full of hot water to satisfy the thermostat 36, at which time both the supply of combustion fuel and the circulation of water through the heater are discontinued.

Hot water is withdrawn from the tank 11 either through the high temperature water supply conduit 17 or through the warm water supply conduit 23. In either case the hot water which is withdrawn from the tank is replaced by cold water from the supply main either through pipe 39 into the heater circulatory loop or directly into the bottom of the tank, as previously described. This incoming cool or cold water will, because of its greater density, tend to stay in the bottom portion 53 of the tank 11 and in the absence of turbulence will not mix with the hot water remaining therein but will form an interface, as at 54, with the remaining hot water in the upper portion 55 of the tank.

It is desired to raise the temperature of the cool water in the lower portion 53 of the tank by circulating it through the heater 12 but without causing sufficient turbulence in the interior of the tank 11 to destroy the interface 54 and cause mixing of the hot and cold water in the tank and resultant lowering of the temperature of the mixed water from the desired high temperature supply. It will be readily understood that while the interface 54 is maintained, the major portion of the hot water thereabove may be withdrawn from the tank at substantially constant temperature, thus supplying a large volume of constant temperature water from a relatively small storage tank. The rate of flow through the heater circulating loop is, as previously stated, desired to be at relatively high rate of flow both from the standpoint of heat input and system temperature recovery rate and to secure turbulent flow through the heat exchange tubes of the heater to avoid scaling and keep the interior surfaces of the tubes clean.

If this circulating flow is not impeded within the tank 11, it will result in turbulence within the tank which will destroy the interface 54. The chamber 42 provided by the enclosure 41 in front of the inlet and outlet of the heater circulating loop and the baffle plates 43, 44 serve to contain the turbulent flow between the inlet 38 and the outlet 33 for the loop within the mixing chamber 42 so that the water in the main body of the tank 11 remains relatively quiescent and the interface 54 intact. Hot water in the chamber 42 will, because of its lower density, tend to move upwardly to join the hot water in the upper portion 55 of the tank 11. This convection movement of the hot water from the chamber 42 occurs relatively slowly through the segmental area 51 and the water rises without turbulence to join the hot water in the upper portion 55 of the tank without materially disturbing the interface 54 which moves down gradually as the contents of the lower portion 53 of the tank are heated.

It will be seen from an inspection of FIGURE 3 that the chamber 42, in effect, forms a part of the circulatory heating loop and that the turbulence in the water entering at 38 and leaving at 33 will be substantially confined within the chamber 42, particularly by the effects of the slanted baffle plates 43, 44. These plates are disposed, respectively, above and below the loop orifices and, being integral with the top 45 and bottom 46 of the enclosure 41, prevent direct movement of the turbulent water within the chamber 42 into the main portion of the tank 11. The circulating heating operation above described will continue until the interface 54 reaches the thermostat 36 which operates the relay 35 to shut off the supply of fuel to the heater and the circulation of water through the loop.

The inclined baffle plates 43, 44 may be set at a widely varied angular relation to their top and bottom plates 45 and 46, being effective with angular relations from substantially 25 degrees to 90 degrees, a preferred embodiment being illustrated at 60 degrees. Likewise, the size of the enclosure 41 and the length of the baffle plates 43, 44 may be varied over wide limits, particularly with change in the size of the tank 11 and the rate of flow through the circulating heating loop. By way of example only, for one rate of flow, the enclosure 41 may be 18 inches high, 10 inches wide and 8 inches deep and the baffle plates 43, 44, 2½ inches from their free edges to the front edges of the enclosure.

While the circulating loop connections at 33 and 38 have been shown vertically spaced, the mixing chamber 42 is equally effective when the loop orifices are horizontally spaced.

While a certain preferred embodiment of the present invention has been specifically illustrated and described, it will be understood that the invention is not limited thereto as many variations will be apparent to those skilled in the art and the invention is to be given its broadest interpretation within the terms of the following claims.

We claim:

1. A water heating and storage system comprising: a hot water storage tank; a water heater, a water circulating loop interconnecting said tank and heater, said loop including water inlet and outlet connections being spaced apart and communicating with the lower portion of said tank; an enclosure within said tank in front of said inlet and outlet connections and forming a mixing chamber constituting substantially a part of said circulating loop, said enclosure having top and bottom walls whose forward edges do not engage the adjacent walls of the storage tank to form thereat the sole communications between said mixing chamber and the main body of the tank; and baffle plates at the forward edges of said top and bottom walls and extending inwardly of the chamber to substantially confine turbulence of the circulating water within the chamber and provide for slow convection movement of hot water from the chamber into the tank through the passage provided between the top enclosure wall and the adjacent tank wall.

2. A water heating and storage system comprising: a hot water storage tank; a water heater; a water circulating loop interconnecting said tank and heater, said loop including water inlet and outlet connections to said hot water storage tank, said connections being spaced apart and communicating with the lower portion of said tank; and an enclosure within said tank in front of said inlet and outlet connections and forming a mixing chamber constituting substantially a part of said circulating loop, the interior wall of said tank adjacent said enclosure being horizontally curved and the top and bottom front edges of the enclosure being substantially straight to form segmented areas between top and bottom walls of the enclosure and the adjacent curved tank wall constituting the sole communication between the mixing chamber and the main body of the tank.

3. A water heating and storage system comprising: a hot water storage tank; a water heater; a water circulating loop interconnecting said tank and heater, said loop including water inlet and outlet connections to said hot water storage tank, said connections being spaced apart and communicating with the lower portion of said tank; an enclosure within said tank in front of said inlet and outlet connections and forming a mixing chamber constituting substantially a part of said circulating loop, the interior wall of said tank adjacent said enclosure being horizontally curved and the top and bottom front edges of the enclosure being substantially straight to form segmented areas between top and bottom walls of the enclosure and the adjacent curved tank wall constituting the sole communication between the mixing chamber and the main body of the tank; and baffle plates extending from the front edges of said top and bottom walls inwardly of the chamber to substantially restrict the turbulent circulating water to the mixing chamber and provide for only slow movement of water between the mixing chamber and the tank.

4. The system described in claim 3 in which said baffle plates incline from the vertical toward the back wall of the enclosure.

5. The system defined in claim 4 in which said baffle plates are located, respectively, substantially above and below the inlet and outlet connections for the circulating loop.

6. A water heating and storage system comprising: a hot water storage tank; a water heater; a water circulating loop interconnecting said tank and heater, said loop including water inlet and outlet connections to said hot water storage tank, said connections being spaced apart and communicating with the lower portion of said tank; an enclosure within said tank in front of said inlet and outlet connections and forming a mixing chamber constituting substantially a part of said circulating loop, said enclosure having top and bottom walls whose forward edges do not engage the adjacent walls of the storage tank to form thereat the sole communications between said mixing chamber and the main body of the tank, said enclosure being continuous and having its forward vertical edges engaged with the walls of the tank so that the only communication between the mixing chamber and the main body of the tank is through the spacing between the top and bottom walls of the enclosure and the adjacent wall of the tank; and means restricting said communication so that the turbulent circulating water in the mixing chamber is substantially restricted thereto and movement of water between the mixing chamber and tank is effected slowly through the communication space.

7. The system defined in claim 6 in which the forward edges of the top and bottom enclosure walls are substantially straight and the adjacent wall of the storage tank is horizontally curved to provide substantially segmental areas thereat forming the communication space.

8. The system defined in claim 6 in which said restricting means are baffle plates extending inwardly of the mixing chamber from the forward edges of the top and bottom enclosure walls.

9. The system defined in claim 7 in which the restriction means are baffle plates secured to the straight forward edges of the top and bottom enclosure walls and extending inwardly of the chamber and inclined from the vertical toward the back wall of the enclosure.

10. A storage tank for a water heating and storage system comprising: a cylindrical casing; top and bottom closures for said casing; means for supporting said tank with the axis of the casing vertical; spaced inlet and outlet means through the lower portion of said tank for connection to a circulatory heating loop; and an enclosure within said tank on the wall thereof through which said inlet and outlet means open to form a mixing chamber which substantially forms a part of the heating loop, the top and bottom walls of said enclosure being substantially straight to leave segmental discontinuities toward the adjacent cylindrical tank wall constituting substantially the sole communicating passages between the mixing chamber and the main body of the tank.

11. The storage tank defined in claim 10 including baffle plates extending inwardly of the mixing chamber from the forward edges of said enclosure top and bottom walls to substantially restrict the turbulence of the circulating water to the mixing chamber.

12. The storage tank defined in claim 11 in which said baffle plates are mounted, respectively, substantially above and below said inlet and outlet means and incline from the vertical toward the back wall of the enclosure.

References Cited by the Examiner
UNITED STATES PATENTS

| | | | |
|---|---|---|---|
| 1,775,208 | 9/1930 | Neukam | 122—13 X |
| 2,833,273 | 5/1958 | Miller | 126—362 |

FREDERICK L. MATTESON, JR., *Primary Examiner.*

R. A. DUA, *Assistant Examiner.*